United States Patent
Zhang et al.

(10) Patent No.: US 12,165,399 B2
(45) Date of Patent: Dec. 10, 2024

(54) SYSTEMS AND METHODS TO DETERMINE AN ACTIVITY ASSOCIATED WITH AN OBJECT OF INTEREST

(71) Applicant: Halliburton Energy Services, Inc., Houston, TX (US)

(72) Inventors: Daili Zhang, Houston, TX (US); Varun Tyagi, Houston, TX (US); Fahad Ahmad, Houston, TX (US); Julien Christian Marck, Houston, TX (US); Olivier Roger Germain, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 339 days.

(21) Appl. No.: 17/564,612

(22) Filed: Dec. 29, 2021

(65) Prior Publication Data

US 2023/0206615 A1  Jun. 29, 2023

(51) Int. Cl.
*G06V 10/00* (2022.01)
*G06T 7/20* (2017.01)
*G06T 7/70* (2017.01)
*G06V 10/82* (2022.01)

(52) U.S. Cl.
CPC ............... *G06V 10/82* (2022.01); *G06T 7/20* (2013.01); *G06T 7/70* (2017.01)

(58) Field of Classification Search
CPC ...... G06V 20/52; G06V 10/82; G06V 10/255; G06T 7/70; G06T 7/20
See application file for complete search history.

(56) References Cited

U.S. PATENT DOCUMENTS

| | | | | |
|---|---|---|---|---|
| 6,678,413 B1 * | 1/2004 | Liang | ....................... | G06T 7/20 348/169 |
| 7,227,893 B1 * | 6/2007 | Srinivasa | ......... | G08B 13/19602 348/169 |
| 8,687,844 B2 * | 4/2014 | Choe | ..................... | G06V 10/25 382/209 |

(Continued)

FOREIGN PATENT DOCUMENTS

| | | |
|---|---|---|
| KR | 10-2021-0132998 A | 11/2021 |
| WO | 2019152177 A2 | 8/2019 |

OTHER PUBLICATIONS

Liu, "CN112635045A Intelligent monitoring system"; Publication Apr. 9, 2021.*

(Continued)

*Primary Examiner* — Amir Alavi
(74) *Attorney, Agent, or Firm* — Barnes & Thornburg, LLP (57) ABSTRACT

Systems and methods to determine an activity associated with an object of interest are presented. The method includes receiving a sequence of a plurality of frames that capture an area of interest during a threshold period of time, wherein an object of interest is present in the area of interest during the threshold period of time. The method also includes analyzing the plurality of frames to detect the object of interest. The method also includes tracking the object of interest in the area of interest during the threshold period of time. The method also includes extracting data indicative of the object of interest. The method also includes predicting, based on the data indicative of the object of interest, an activity associated with the object of interest.

19 Claims, 5 Drawing Sheets

(56) References Cited

U.S. PATENT DOCUMENTS

| | | | | |
|---|---|---|---|---|
| 9,582,762 B1* | 2/2017 | Cosic | ................... | H04N 7/157 |
| 10,152,858 B2* | 12/2018 | Boykin | ................. | G11B 27/10 |
| 10,165,159 B2* | 12/2018 | Cassini | ................ | H04N 23/51 |
| 10,296,794 B2* | 5/2019 | Ratti | ................... | G06V 10/764 |
| 10,628,667 B2* | 4/2020 | Porikli | ................ | G06V 40/28 |
| 10,645,344 B2* | 5/2020 | Marman | ............... | G06T 7/277 |
| 10,965,886 B2* | 3/2021 | Gupta | ................ | G06V 20/47 |
| 10,997,421 B2* | 5/2021 | Khosla | ................ | G06V 20/52 |
| 2017/0180680 A1 | 6/2017 | Yu | | |
| 2021/0081676 A1 | 3/2021 | Kim et al. | | |
| 2023/0206615 A1* | 6/2023 | Zhang | ................. | G06V 10/82 |
| | | | | 382/103 |

OTHER PUBLICATIONS

Chatar, et al. "Indranil Roychoudhury Determining Rig State from Computer Vision Analytics", Paper presented at the SPE/IADC International Drilling Conference and Exhibition, Virtual, Mar. 2021, SPE-204086-MS.

Kamkar et al., "Multiple-target tracking in human and machine vision", PLOS Computational Bology, pp. 1-28, Apr. 9, 2020.

International Search Report and Written Opinion issued on Sep. 27, 2022 in PCT/US2021/065608 (12 pages).

* cited by examiner

SYSTEMS AND METHODS TO DETERMINE AN ACTIVITY ASSOCIATED WITH AN OBJECT OF INTEREST

BACKGROUND

The present disclosure relates generally to systems and methods to determine an activity associated with an object of interest.

Cameras and other types of optical equipment that are configured to capture images and videos of objects are sometimes used to capture the objects of interest over a period of time. Moreover, cameras and other types of optical equipment are sometimes placed within or near an area of interest to capture objects of interest within the area of interest, and movements of the objects of interest within the area of interest and over a period of time.

BRIEF DESCRIPTION OF THE DRAWINGS

Illustrative embodiments of the present disclosure are described in detail below with reference to the attached drawing figures, which are incorporated by reference herein, and wherein.

The illustrated figures are only exemplary and are not intended to assert or imply any limitation with regard to the environment, architecture, design, or process in which different embodiments may be implemented.

DETAILED DESCRIPTION

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

The present disclosure relates to systems and methods to determine an activity associated with an object of interest. As referred to herein, an object of interest refers to any animate or inanimate object including, but not limited to, people, machines, tools, and other animate or inanimate objects. Further, as referred to herein, an activity associated with an object of interest includes any activity performed by the object of interest, performed on the object of interest, or performed with respect to the object of interest. For example, where the object of interest is a rig operator, an activity associated with the object of interest would be the rig operator walking across a work station or picking up a tool. Further, where the object of interest is a tool, such as the tool picked up by the rig operator, an activity of interest associated with the tool includes the tool being picked up by the rig operator.

Figure 1:
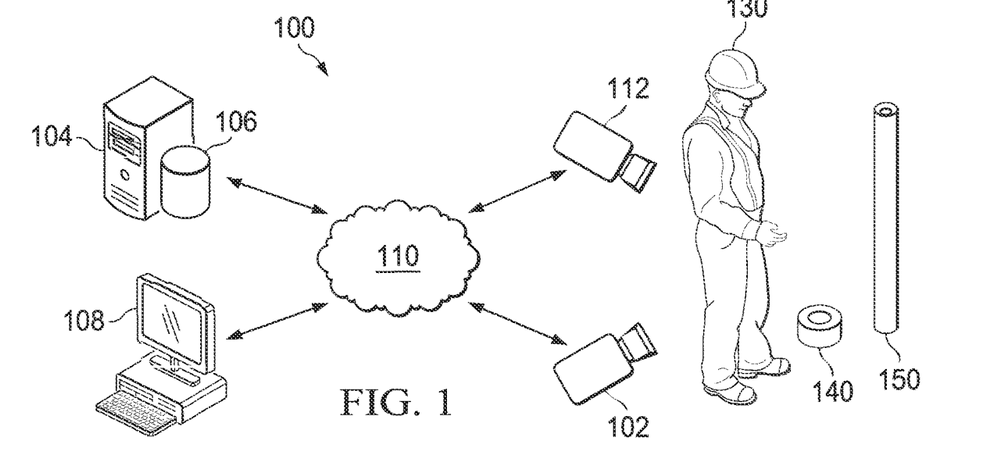
FIG. 1 a is a network environment for determining an activity associated with an object of interest.

A system that is operable to determine an activity associated with an object of interest, such as the system illustrated in FIG. 1, is communicatively connected to one or more optical instruments that are positioned at or near an area of interest to capture multiple frames of the area of interest or a section of the area of interest over a period of time. Examples of optical instruments include, but are not limited to, cameras, video recorders, and other optical instruments configured to capture frames of images or videos over a period of time. The system receives a sequence of frames that capture the area of interest during the period of time while the object of interest is present in the area of interest during the period of time. For example, where the object of interest is a wrench placed on a work bench of a machine shop (the area of interest), and one or more cameras positioned at different locations of the machine shop capture frames of the machine shop from 9:00 AM to 5:00 PM (period of time), then the system communicates with the one or more cameras to obtain the frames of the captured frames of the machine shop from 9:00 AM to 5:00 PM. In some embodiments, the system controls or adjusts one or more modes of the optical instruments, and/or controls or adjusts the orientation of the optical instruments to capture a different perspective view of the object of interest or the area of interest. In some embodiments, the system performs a perspective transformation of the captured frames that contain the object of interest. As referred to herein, a perspective transformation refers to transforming one type of view (e.g., top-down view) to a second type of view (e.g., side view). For example, where the object of interest is being captured by three different cameras each capturing a side perspective view of the object of interest. The system is configured to analyze frames of the object of interest that are captured by the three cameras, and generate new frames capturing a frontal view of the object of interest by combining existing frames or portions of existing frames of the object of interest.

The system analyzes the frames, such as the frames of the machine shop from 9:00 AM to 5:00 PM, to detect the object of interest, such as the wrench. In some embodiments, an operator of the system initially identifies and tags the object of interest (wrench) in one or more frames (e.g., first five frames, first 10 frames, first 50 frames, or the first threshold number of frames of 1,000 total frames that capture the object of interest) of the captured frames to indicate the presence of the object of interest in the frames. The system, in turn, analyzes the one or more frames containing the identified object of interest or tags of the identified object of interest, applies an object detection algorithm to identify and tag the object of interest in the other captured frames (e.g., the remaining frames of the 1,000 frames not manually analyzed and tagged by the operator). In some embodiments, the system dynamically executes an object detection algorithm to analyze the frames to detect and tag the object of interest. In some embodiments, the system also assigns an identifier to the object of interest, and provides the identifier for display in each frame that captures the object of interest. As referred to herein, an identifier of an object of interest includes any identification associated with the object of interest including, but not limited to, words, numbers, symbols, and other types of identifiers to help the operator identity the object of interest in the captured frames. Additional descriptions and illustrations of identifiers are provided in the paragraphs below and are illustrated in at least FIGS. 2 and 3A-3C.

The system also tracks the object of interest in the area of interest over the period of time. Continuing with the foregoing example, the system executes an object tracking algorithm to determine and track the location and changes in the location of the wrench from 9:00 AM to 5:00 PM. Moreover, where the cameras capture an employee entering the machine shop at 4:00 PM, retrieves the wrench, and tightens a mandrel with the wrench, the system executes the object tracking algorithm to determine and track the location of the wrench, interactions between the employee (or another object of interest) and the wrench, and interactions between the wrench and the mandrel (or another object of interest).

The system then extracts data indicative of the object of interest, and predicts, based on the data indicative of the object of interest, an activity associated with the object of interest. Continuing with the foregoing example, the system extracts data indicative of the wrench and interactions the employee had with the wrench to tighten the mandrel, and predicts who interacted with the wrench (the employee and the identity of the employee), what the wrench is used for (to tighten the mandrel), what the wrench is used on (the mandrel), when interactions with the wrench took place (from 4:00 PM), what the wrench may be used for in a subsequent frame, as well as other interactions that involve the wrench. In some embodiments, data indicative of the object of interest contains additional information regarding the object of interest, such as the tracking coordinates of the object of interest, the movement speed of the object of interest, change in the state of the object of interest, and other additional information regarding the object of interest. In some embodiments, the system predicts, based on the data indicative of the object of interest, a classification of an activity associated with the object of interest. In some embodiments, the system compares an activity with one or more predefined or pre-classified activities, determines whether an activity matches a predefined activity, and predicts that the activity is or will be the predefined activity if the activity matches the predefined activity. In one or more of such embodiments, the system accesses a storage medium that contains a library of predefined activities and classifications of the predefined activities, and executes an activity classification algorithm to compare the activity with the predefined activities and to determine whether an activity matches any predefined activities or belongs to any classifications of activities. In one or more of such embodiments, the system is also configured to define new activities and new classifications of activities, and store the newly-defined activities and classifications of activities in the library of predefined activities for future use.

In one or more of such embodiments, the system also provides the additional information for display, such as displaying the tracking coordinates of the object of interest on a display screen, to facilitate an operator of the system to identify the location of the object of interest, and interactions involving the object of interest. In one or more of such embodiments, the system also analyzes data indicative of the object of interest to predict a future state of the object of interest and future activities involving the object of interest. Continuing with the foregoing example, where the system determines that after the employee tightened the mandrel, the employee walked towards a second mandrel in the machine shop with the last captured frame illustrating the employee reaching for the second mandrel while holding the wrench, the system predicts that the employee will also use the wrench to tighten the second mandrel.

In some embodiments, the system analyzes data indicative of the object of interest, and determines or predicts a likelihood of a present or future activity associated with the object of interest. Continuing with the foregoing example, where the system analyzes past interactions (employee using the wrench to tighten a mandrel) and current interactions (employee reaching at a second mandrel while holding the wrench), the system also assigns a likelihood for each interaction associated with the wrench, such as the system has an 95% certainty that the employee used the wrench to tighten the mandrel, and the system has an 86% certainty that the employee is walking towards the second mandrel. In one or more of such embodiments, the system also determines and assigns a likelihood for a future interaction with the object of interest. Continuing with the foregoing example, where the system predicts that the employee will use the wrench to tighten the second mandrel, the system also determines a likelihood that the employee will actually use the wrench to tighten the second mandrel (e.g., the system has a 83% certainty that the employee will use the wrench to tighten the second mandrel). In one or more of such embodiments, the system also assigns a numerical value associated with the likelihood of a past, present, or future activity associated with the object of interest, and provides the numerical value for display to an operator of the system. Additional descriptions and illustrations of numerical values and other indications of the likelihood of a past, present, or future activity associated with an object of interest are provided in the paragraphs below and are illustrated in at least FIGS. 2 and 3A-3C.

In some embodiments, the system is configured to simultaneously track multiple objects of interest, such as the employee, the wrench, and the mandrels, distances between different objects of interest, and activities between the objects of interest to predict past, present, and future activities involving the objects of interest as well as interactions between one or more of the objects of interest. Additional descriptions of the foregoing systems and methods to determine an activity associated with an object of interest are described in the paragraphs below and are illustrated in FIGS. 1-6.

Now turning to the figures, FIG. 1 is a network environment 100 for determining an activity associated with an object of interest. Network environment 100 includes a system 104 that is communicatively connected to an electronic device 108, a storage medium 106, a first optical instrument 102, and a second optical instrument 112 via a network 110.

First and second optical instruments 102 and 112 include any electronic device configured to capture frames of images or videos over a period of time. In the embodiment of FIG.

1, first and second optical instruments 102 and 112 are cameras that are positioned in or near an area of interest and configured to capture frames of the area of interest, which in the embodiment of FIG. 1, is a work area having a worker 130, a grease bucket 140, and a pipe 150, each representing an object of interest.

In some embodiments, system 104 instructs first and second optical instruments 102 and 112 to adjust one or more modes of first and second optical instruments 102 and 112. Examples of modes of first and second optical instruments 102 and 112 include, but are not limited to, zoom in, zoom out, capture more or less frames over the period of time, start capturing, stop capturing, focus, and other available modes of first and second optical instruments. In some embodiments, system 104 is configured to adjust orientations of first and second optical instruments 102 and 112. In one or more of such embodiments, system 104 is configured to adjust the orientations of first and second optical instruments 102 and 112 to adjust the captured frames from being in one perspective (e.g., side perspective) to a second perspective (e.g., frontal perspective). In one or more of such embodiments, system 104 is configured to perform a perspective transformation by combining the captured frames of first and second optical instruments 102 and 112 to form new frames having a different respective.

System 104 receives frames of the work area that are captured by first and second optical instruments 102 and 112, and analyzes the captured frames to detect the presence of worker 130, grease bucket 140, and pipe 150. In some embodiments, system 104 provides some of the captured frames for display on electronic device 108, and an operator of the electronic device 108 manually identifies the presence of worker 130, grease bucket 140, and pipe 150 via the electronic device 108. As referred to herein, electronic device 108 is any device operable to provide the captured frames of the area of interest for display. Examples of electronic device 108 include work management stations, server systems, desktop computers, laptop computers, tablet computers, smartphones, smart watches, PDAs, as well as similar electronic devices having a processor operable to provide the captured frames of the area of interest for display. In some embodiments, where the operator of electronic device 108 manually identifies the presence of worker 130, grease bucket 140, and pipe 150 in some of the captured frames, system 104 is configured to analyze the presence of worker 130, grease bucket 140, and pipe 150, and dynamically analyze the remaining captured frames for the presence of worker 130, grease bucket 140, and pipe 150. In some embodiments, system 104 is also configured to dynamically tag worker 130, grease bucket 140, and pipe 150 or include identifiers associated with worker 130, grease bucket 140, and pipe 150 in the remaining captured frames. Additional examples of identifiers and tags of objects of interest are provided in the paragraphs below and are illustrated in at least FIGS. 2 and 3A-3C.

In some embodiments, system 104 is configured to dynamically analyze the captured frames of the work area of another area of interest (not shown) for the presence of worker 130, grease bucket 140, pipe 150, and/or other objects of interests. In one or more of such embodiments, system 104 is configured to analyze previously-captured frames (e.g., previously-captured by first and second optical instruments 102 and 112 or by another optical instrument (not shown)) for tags of worker 130, grease bucket 140, pipe 150, and/or other objects that were tagged in the previously-captured frames, and dynamically determine the presence of worker 130, grease bucket 140, pipe 150, and/or other objects in the frames captured by first and second optical instruments 102 and 112. In one or more of such embodiments, system 104, after determining the presence of worker 130, grease bucket 140, pipe 150, and/or other objects in the frames captured by first and second optical instruments 102 and 112, also tags or includes identifiers associated with worker 130, grease bucket 140, pipe 150, and/or other objects.

System 104 also tracks worker 130, grease bucket 140, and pipe 150 in the work area to determine the relative locations of worker 130, grease bucket 140, and pipe 150. In some embodiments, system 104 executes an object tracking algorithm that separately tracks worker 130, grease bucket 140, pipe 150, and any other objects of interest in the work area during a captured period of time. In some embodiments, system 104 tracks the absolute coordinates, relative coordinates, movement speeds (or lack of movement), distance between worker 130, grease bucket 140, and pipe 150, and other indications of motion or location of worker 130, grease bucket 140, and pipe 150 during the period of time.

System 104 extracts data indicative of worker 130, grease bucket 140, pipe 150, and/or other objects, such as the coordinates, movement speeds (or lack of movement), and other indications of motion, orientation, and/or location of worker 130, grease bucket 140, pipe 150, and/or other objects. For example, where first and second optical instruments 102 and 112 capture frames of worker 130 moving towards grease bucket 140, picking up grease bucket 140, and heading towards pipe 150 during the period of time, system 104 extracts data indicative of movement of worker 130, absolute coordinates of worker 130, grease bucket 140, and pipe 150, relative coordinates of worker 130 with respect to grease bucket 140 and pipe 150, and other indications of motion or location of worker 130, grease bucket 140, and pipe 150.

System 104 then predicts, based on the data indicative of worker 130, grease bucket 140, pipe 150, and/or other objects, such as the coordinates, movement speeds (or lack of movement), and other indications of motion or location of worker 130, grease bucket 140, pipe 150, and/or other objects, and activities associated with worker 130, grease bucket 140, pipe 150, and/or other objects. In some embodiments, system 104 compares an activity, such as worker 130 picking up grease bucket 140 with one or more predefined activities such as applying grease from grease bucket 140, determines whether an activity matches a predefined activity, and predicts that the activity is or will be the predefined activity if the activity matches the predefined activity. In one or more of such embodiments, system 104 accesses storage medium 106, which contains a library of predefined activities, and executes an activity classification algorithm to compare the activity with the predefined activities and to determine whether an activity matches any predefined activities. In one or more of such embodiments, system 104 is also configured to define new activities and store the newly-defined activities in the library of predefined activities for future use.

In some embodiments, system 104 determines a prior state and/or a current state of an object of interest such as worker 130, grease bucket 140, pipe 150, and/or other objects, and predicts activates associated with the object of interest based on the prior or current states of the object of interest. In one or more of such embodiments, system 104 determines the prior and current states of the object of interest based on prior movement and current movement of the object of interest, and predicts the future movement of the object of interest based on the prior and current movements of the object of interest. In one or more of such embodiments, system 104 also predicts an activity of the object of interest based on the prior, current, and/or future movement of the object of interest. Continuing with the foregoing example, system 104, in response to a determination that worker 130 previously walked towards grease bucket 140 (prior movement), picked up grease bucket 140 (prior movement), and is currently heading towards pipe 150 (current movement), predicts that worker 130 intends to apply grease from grease bucket 140 to pipe 150 to grease pipe 150 (future movement and predicted activity of worker 130). In some embodiments, system 104 utilizes a neural network or another algorithm to analyze the data indicative of the object of interest to predict the activity associated with the object of interest.

System 104 provides tracking and identifier information associated with the objects of interest, and information regarding the predicted activities associated with the objects of interest for display on electronic device 108. In some embodiments, system 104 provides for display an identifier of each of worker 130, grease bucket 140, and pipe 150, numerical values indicative of the likelihood of worker 130, grease bucket 140, and pipe 150 being accurately identified in the captured frames, and likelihood of the predicted activities associated with worker 130, grease bucket 140, and pipe 150 for display on electronic device 108. Additional descriptions and illustrations of tracking and identifier information associated with the objects of interest, and information regarding the predicted activities associated with the objects of interest are provided herein and are illustrated in at least FIGS. 2, 3A-3C, and 4.

Storage medium 106 includes any device configured to store instructions, which when executed by one or more processors of system 104, cause the processors to perform operations described herein to determine an activity associated with an object of interest. Storage medium 106 may be formed from data storage components such as, but not limited to, read-only memory (ROM), random access memory (RAM), flash memory, magnetic hard drives, solid state hard drives, CD-ROM drives, DVD drives, floppy disk drives, as well as other types of data storage components and devices. In some embodiments, the storage medium 106 includes multiple data storage devices. In further embodiments, the multiple data storage devices may be physically stored at different locations. In one of such embodiments, the data storage devices are components of a server station, such as a cloud server. In the embodiment of FIG. 1, frames captured by first and second optical instruments 102 and 112, algorithms such as the neural network, and libraries of predefined activities are stored in storage medium 106. In some embodiments, frames captured by first and second optical instruments 102 and 112, algorithms such as the neural network, and libraries of predefined activities are also stored in other storage mediums (not shown).

Although FIG. 1 illustrates first and second optical instruments 102 and 112, in some embodiments, a different number of optical instruments are positioned at or near the area of interest. Further, although FIG. 1 illustrates first and second optical instruments 102 and 112 positioned at or near one area of interest, in some embodiments, system 104 is communicatively connected to multiple optical instruments positioned at or near multiple areas of interest. In one or more of such embodiments, system 104 is configured to perform the operations described herein to sequentially or concurrently determine the activity associated with different objects of interest located in different areas of interest.

Figure 2:
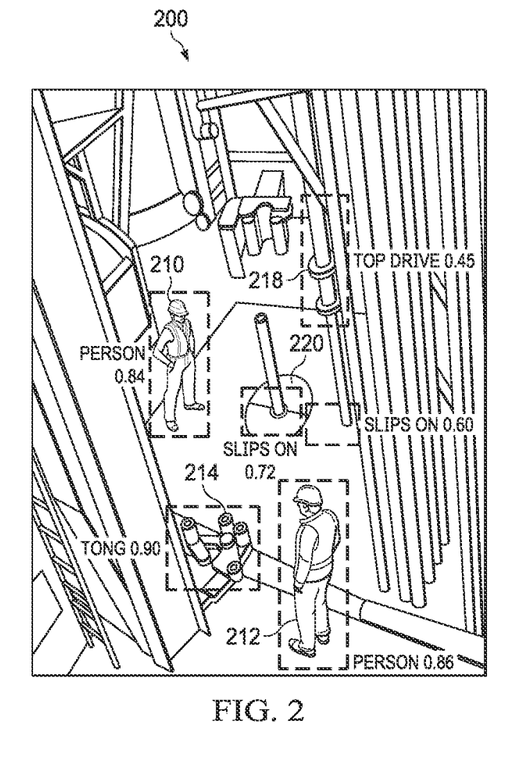
FIG. 2 is an illustration of an image of an area of interest that contains five objects of interest.

FIG. 2 is an illustration of an image 200 of an area of interest that contains five objects of interest. In the embodiment of FIG. 2, two workers 210 and 212 are working in the area of interest that contains a tong 214, a top drive 218, and slips 220. A text-based identifier ("person," "top drive," "slips," and "tong") is provided for display next to each object of interest 210, 212, 214, 218, and 220 to identify the corresponding object of interest 210, 212, 214, 218, and 220. Further, a rectangle is also drawn around each object of interest 210, 212, 214, 218, and 220 to identify the corresponding object of interest 210, 212, 214, 218, and 220. Moreover, a numerical value indicative of the likelihood that the identified object of interest is the actual object of interest is located at a location in the area of interest, or is performing a specific action is also provided. For example, the numerical value "0.86," which is displayed next to worker 212 indicates that there is an 86% certainty that the individual captured by image 200 is worker 212. Similarly, the numerical value "0.90," which is displayed next to tong 214 indicates that there is an 90% certainty that the apparatus captured by image 200 is tong 214. In some embodiments, the numerical values represent the likelihood that the corresponding objects of interest are located at the position shown in image 200. In some embodiments, some of the numerical values represent the likelihood that the corresponding objects of interest (worker 210 and worker 212) are performing certain actions, such as there is an 86% chance that worker 212 is leaning against a pipe, and there is an 84% chance that worker 210 is walking at one meter per second towards slips 220.

Figure 3A:
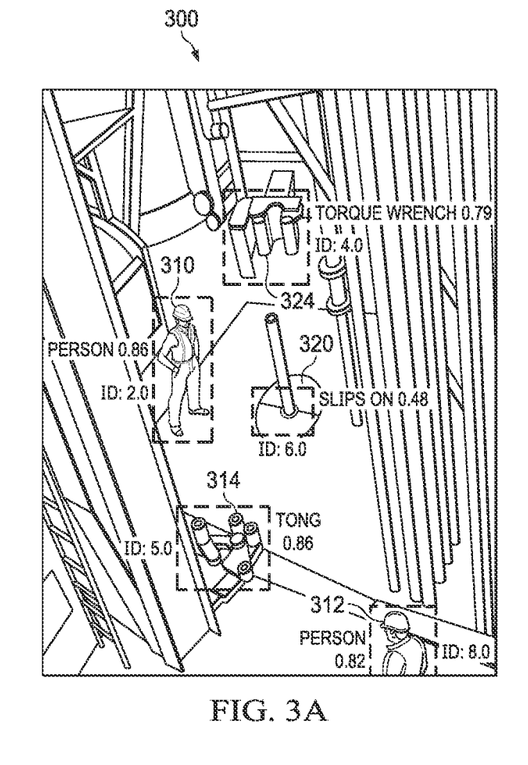
FIG. 3A is an illustration of a first image of an area of interest at time equals T1 that contains five objects of interest.
Figure 3B:
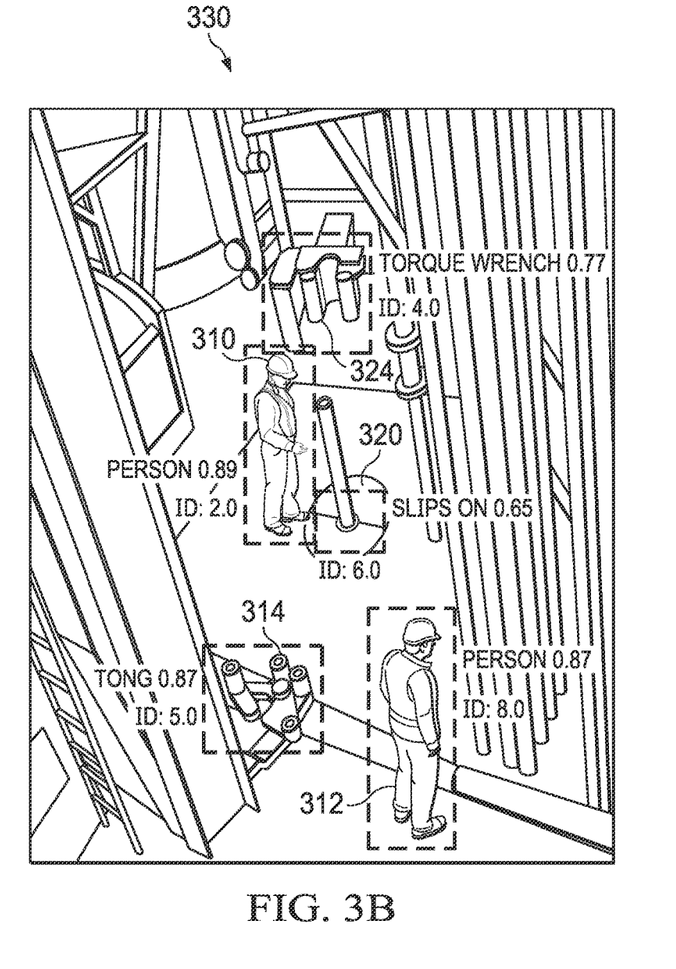
FIG. 3B is an illustration of a second image of the area of interest of FIG. 3A at time equals T2 that contains the five objects of interest of FIG. 3A, where T2 is a time later than T1.
Figure 3C:
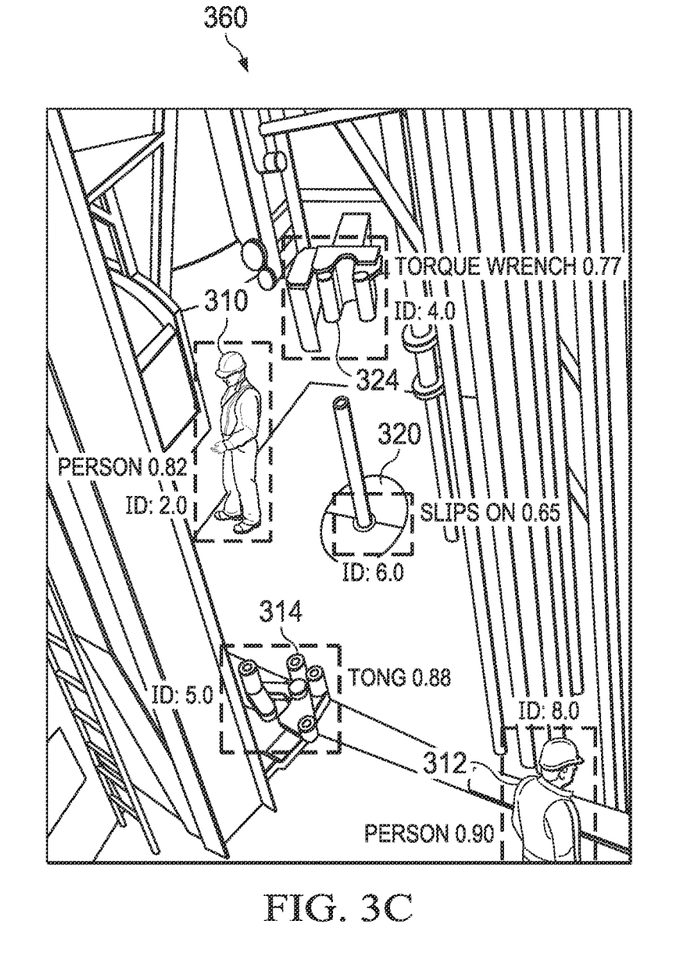
FIG. 3C is an illustration of a third image of the area of interest of FIG. 3B at time equals T3 that contains the five objects of interest of FIG. 3B, where T3 is a time later than T2.

FIG. 3A is an illustration of a first image 300 of an area of interest at time equals T1 that contains five objects of interest, which includes worker 310, worker 312, tong 314, slips 320, and torque wrench 324. FIG. 3B is an illustration of a second image 330 of the area of interest of FIG. 3A at time equals T2 that contains the five objects of interest of FIG. 3A, where T2 is a time later than T1. Further, FIG. 3C is an illustration of a third image 360 of the area of interest of FIG. 3B at time equals T3 that contains the five objects of interest of FIG. 3B, where T3 is a time later than T2. A text-based identifier ("person," "torque," "tong," "slips," and "torque wrench") is provided for display next to each object of interest 310, 312, 314, 320, and 324 to identify the corresponding object of interest 310, 312, 314, 320, and 324.

Moreover, a numerical value indicative of the likelihood that the identified object of interest is the actual object of interest, is located at a location in the area of interest, or is performing a specific action is also provided. For example, the numerical value "0.86," which is displayed next to tong 314 in image 300 indicates that there is an 86% certainty that tong 314 captured by image 300 at time T1 is located at the location illustrated in image 300, the numerical value "0.87" next to tong 314 captured by image 330 at time T2 indicates that there is an 87% certainty that tong 314 captured by image 330 at time T2 is located at the location illustrated in image 330, and the numerical value "0.88" next to tong 314 captured by image 360 at time T3 indicates that there is an 88% certainty that tong 314 captured by image 360 at time T3 is located at the location illustrated in image 360. In some embodiments, the accuracies of the system's predictions improve as the system tracks an object of interest over time, which is illustrated by the increase in the numerical value of the likelihood that tong 314 is located at the location illustrated in images 300, 330, and 360. The numerical value "0.82," which is displayed next to worker 312 in image 300 indicates that there is an 82% certainty that worker 312 captured by image 300 at time T1 is performing an action (e.g., operating a tool) illustrated in image 300, the numerical value "0.87" next to worker 312 captured by image 330 at time T2 indicates that there is an 87% certainty that worker 312 is operating the tool at time T2 as captured by image 330, and the numerical value "0.90" next to worker 312 captured by image 360 at time T3 indicates that there is an 90% certainty that worker 312 is operating the tool at time T3 as captured by image 360.

Figure 4:
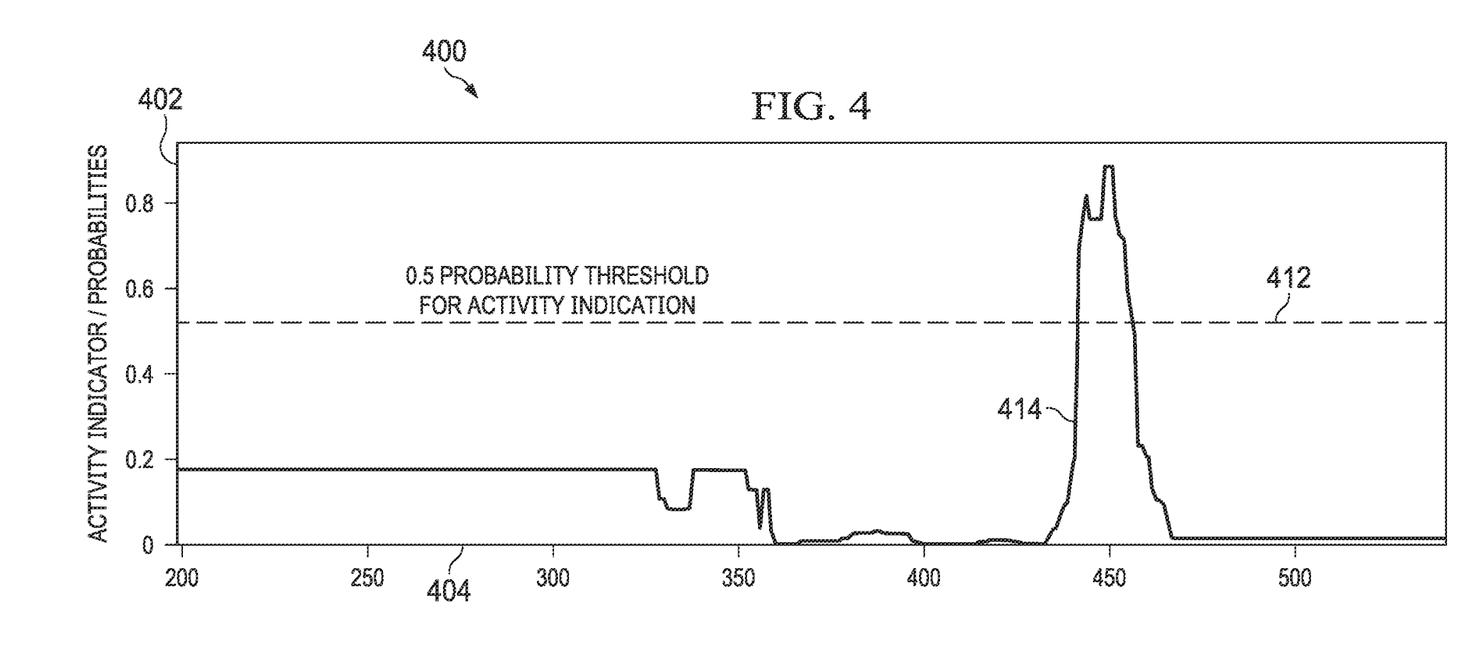
FIG. 4 is a graph of a probability that an object of interest engages in an activity over a period of time.

FIG. 4 is a graph 400 of a probability that an object of interest engages in an activity over a period of time. In the embodiment of FIG. 4, axis 402 represents a probability that an object of interest, such as worker 310 of FIGS. 3A-3C is associated with an activity of interest, such as interacting with torque wrench 324 of FIGS. 3A-3C, where the probability is on a scale of 0-1 where 1 is 100% probable and 0 is 0% probable. Further, axis 404 represents a period of time, such as from the $200^{th}$ frame to the $550^{th}$ frame, from time T200 to time T550, or from 200 seconds to 550 seconds. Further, line 414 represents the probability that the object of interest is associated with the activity of interest from time T200-T500, whereas line 412 represents a threshold probability for the activity of interest. As shown in FIG. 4, the probability of worker 310 interacting with torque wrench 324 is approximately 20% from the $200^{th}$ frame to the $350^{th}$ frame, drops down to approximately 0% from the $350^{th}$ frame to $425^{th}$ frame, increases to approximately 80% from the $425^{th}$ frame to the $460^{th}$ frame, and subsequently decreases to approximately 0% after the $475^{th}$ frame. In some embodiments, the system, such as system 104 of FIG. 1 predicts the likelihood that an object of interest such as worker 310 is or will be associated with an activity such as interacting with torque wrench 324 based on prior or current activities of the object of interest. For example, the system, in response to a determination that worker 310 was walking towards torque wrench 324 at frame T400, determines that worker 310 will interact with torque wrench 324 at frame T425, increases the numerical value of the likelihood that worker 310 will interact with torque wrench 324 at frame T425. In some embodiments, system 104 also provides graph 400 for display on electronic device 108 of FIG. 1.

Figure 5:
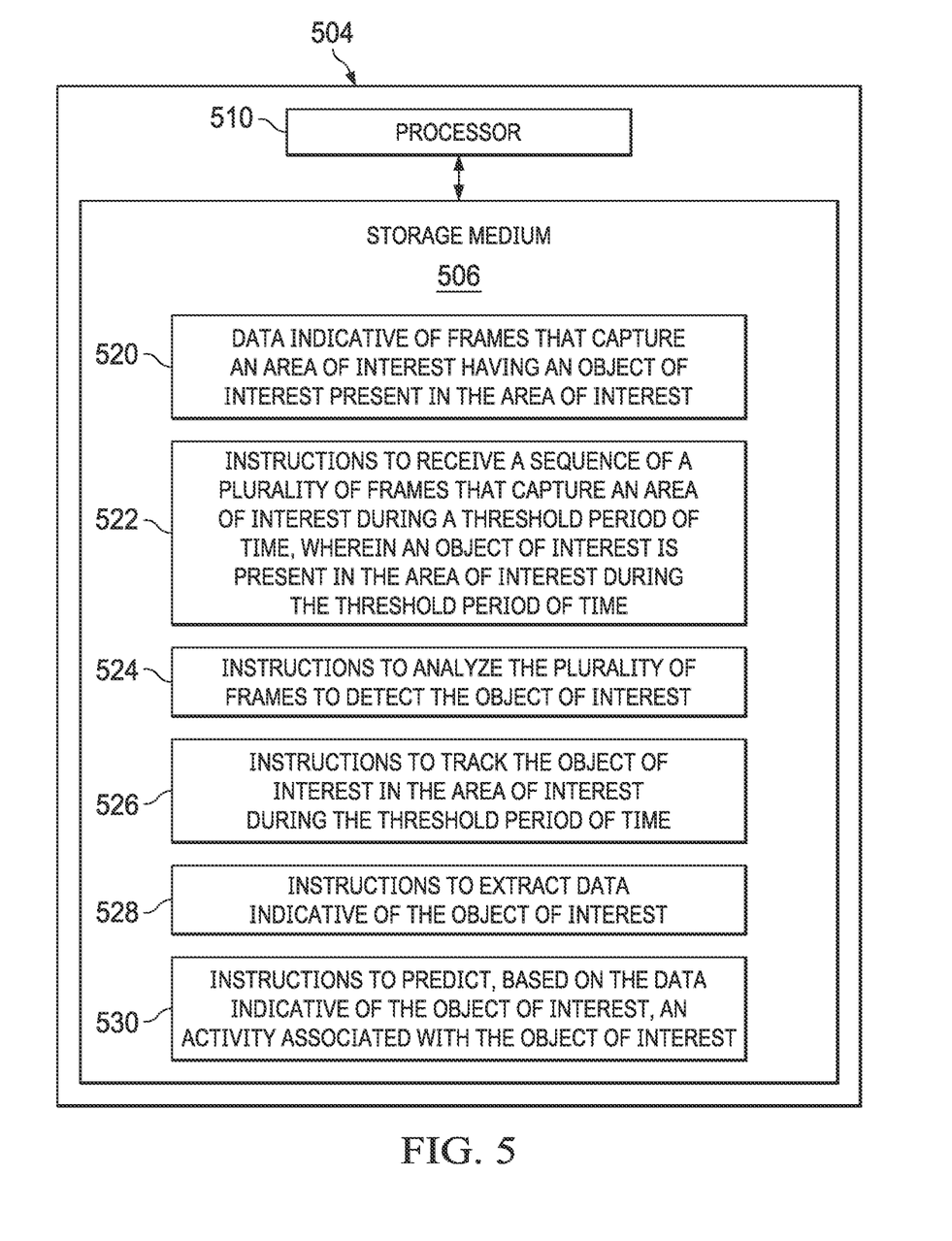
FIG. 5 is a block diagram of the system of FIG. 1 that is operable of performing operations illustrated in the process of FIG. 6 to determine an activity associated with an object of interest.
Figure 6:
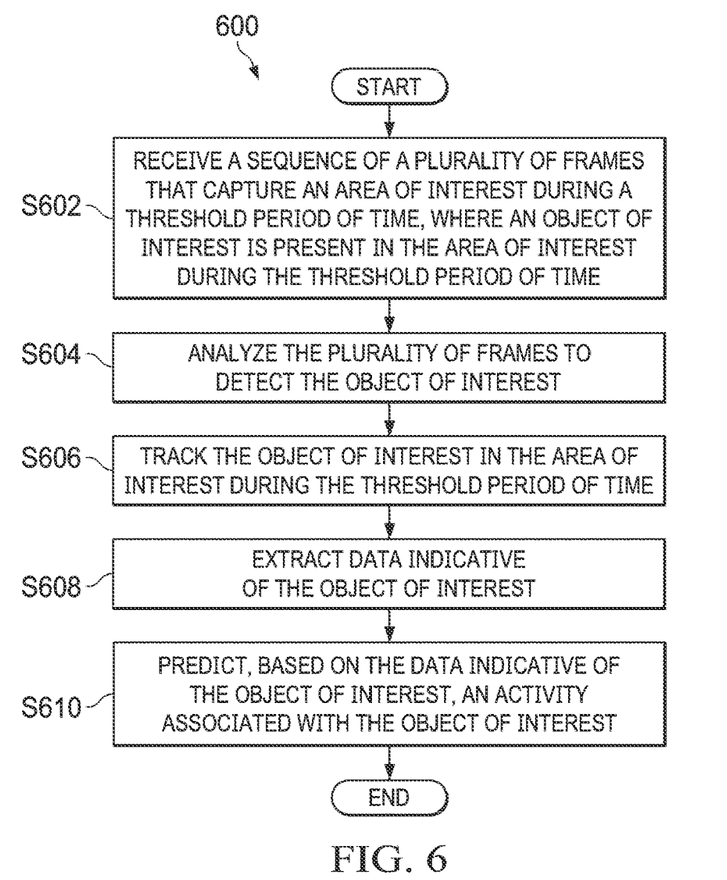
FIG. 6 is a flow chart of a process to determine an activity associated with an object of interest.

FIG. 5 is a block diagram of the system 104 of FIG. 1, where the system 104 is operable of performing the operations illustrated in process 600 of FIG. 6 to determine an activity associated with an object of interest. The system 104 includes a storage medium 506 and a processor 510. The storage medium 506 may be formed from data storage components such as, but not limited to, read-only memory (ROM), random access memory (RAM), flash memory, magnetic hard drives, solid state hard drives, CD-ROM drives, DVD drives, floppy disk drives, as well as other types of data storage components and devices. In some embodiments, the storage medium 506 includes multiple data storage devices. In further embodiments, the multiple data storage devices may be physically stored at different locations. Data indicative of frames that capture an area of interest having an object of interest present in the area of interest are stored at a first location 520 of storage medium 506. Further, instructions to receive a sequence of a plurality of frames that capture an area of interest during a threshold period of time, wherein an object of interest is present in the area of interest during the threshold period of time are stored at a second location 522 of storage medium 506. Further, instructions to analyze the plurality of frames to detect the object of interest are storage at a third location 524 of storage medium 506. Further, instructions to track the object of interest in the area of interest during the threshold period of time are stored at a fourth location 526 of storage medium 506. Further, instructions to extract data indicative of the object of interest are stored at a fifth location 528 of storage medium 506. Further, instructions to predict, based on the data indicative of the object of interest, an activity associated with the object of interest are stored at a sixth location 530 of storage medium 506. Further, additional instructions that are performed by the processor 510 are stored in other locations of the storage medium 506. In some embodiments, storage medium 106 of FIG. 1 is a component or is storage medium 506.

FIG. 6 is a flow chart of a process 600 to determine an activity associated with an object of interest. The process may be performed by the system described herein including the system illustrated in FIG. 1, or one or more processors of the system. Although the operations in process 600 are shown in a particular sequence, certain operations may be performed in different sequences or at the same time where feasible. As described below, process 600 provides an intuitive way for determining an activity associated with an object of interest.

At block S602, a sequence of a plurality of frames that capture an area of interest during a threshold period of time are received. In that regard, FIG. 1 illustrates system 104 receiving a sequence of frames captured by first and second optical instruments 102 and 112 of a work area having a worker 130, a grease bucket 140, and a pipe 150 in the work area. At block S604, the plurality of frames are analyzed to detect the object of interest. In that regard, FIG. 1 illustrates system 104 analyzing frames captured by first and second optical instruments 102 and 112 to detect worker 130, grease bucket 140, and pipe 150 in the work area. At block S606, the object of interest is tracked in the area of interest during the threshold period of time. In that regard, FIG. 1 illustrates system 104 tracking the positions and activities associated with 130, grease bucket 140, and pipe 150 over a period of time. Further, FIGS. 3A-3C illustrate system 104 tracking the positions and activities associated with worker 310, worker 312, tong 314, slips 320, and torque wrench 324 over a period of time including T1, T2, and T3. At block S608, data indicative of the object of interest is extracted. In some embodiments, the system tracks the absolute coordinate, relative coordinate, movement speed (or lack of movement), distance between the object of interest and another object of interest, and other indications of motion or location of the object of interest, and/or action performed by or associated with the object of interest, and extracts the tracked information indicative of the object of interest.

At block S610, an activity associated with the object of interest is predicted based on data indicative of the object of interest. In some embodiments, the system compares an activity with one or more predefined activities, determines whether an activity matches a predefined activity, and predicts that the activity is or will be the predefined activity if the activity matches the pre-classified activity. In one or more of such embodiments, the system accesses a storage medium that contains a library of predefined activities, and executes an activity classification algorithm to compare the activity with the predefined activities and to determine whether an activity matches any predefined activities. In one or more of such embodiments, the system is also configured to define new activities and new classifications of activities, and store the newly-defined activities and classifications of activities in the library of predefined activities for future use. In some embodiments, the system utilizes a neural network or another algorithm to analyze the data indicative of the object of interest to predict the activity associated with the object of interest. In some embodiments, the operations performed at blocks S602, S604, S606, S608, and S610 are simultaneously or sequentially performed to determine activities associated with multiple objects of interest, such as the five objects illustrated in FIGS. 3A-3C.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. For instance, although the flowcharts depict a serial process, some of the steps/processes may be performed in parallel or out of sequence, or combined into a single step/process. The scope of the claims is intended to broadly cover the disclosed embodiments and any such modification. Further, the following clauses represent additional embodiments of the disclosure and should be considered within the scope of the disclosure.

Clause 1, a computer-implemented method to determine an activity associated with an object of interest, the method comprising: receiving a sequence of a plurality of frames that capture an area of interest during a threshold period of time, wherein an object of interest is present in the area of interest during the threshold period of time; analyzing the plurality of frames to detect the object of interest; tracking the object of interest in the area of interest during the threshold period of time; extracting data indicative of the object of interest; and predicting, based on the data indicative of the object of interest, an activity associated with the object of interest.

Clause 2, the computer-implemented method of clause 1, wherein tracking the object of interest comprises tracking coordinates of the object of interest in the area of interest during the period of time, and wherein extracting data indicative of the object of interest comprises extracting the coordinates of the object of interest in the area of interest during the period of time.

Clause 3, the computer-implemented method of clauses 1 or 2, wherein tracking the object of interest comprises tracking a movement speed and a movement direction of the object of interest in the area of interest during the period of time, and wherein extracting data indicative of the object of interest comprises extracting the movement speed and the movement direction of the object of interest in the area of interest during the period of time.

Clause 4, the computer-implemented method of any of clauses 1-3, wherein tracking the object of interest comprises tracking an action performed by the object of interest in the area of interest during the period of time, and wherein extracting data indicative of the object of interest comprises extracting data indicative of the action performed by the object of interest in the area of interest during the period of time.

Clause 5, the computer-implemented method of any of clauses 1-4, wherein analyzing the plurality of frames comprises: identifying a presence of the object of interest in one or more frames of the plurality of frames; and tagging the object of interest in the one or more frames to indicate the presence of the object of interest in the one or more frames.

Clause 6, the computer-implemented method of clause 5, further comprising analyzing previously tagged frames indicating the presence of the object of interest in the previously tagged frames, wherein the object of interest is dynamically tagged to indicate the presence of the object of interest in the one or more frames based on a comparison with the previously tagged frames.

Clause 7, the computer-implemented method of clauses 5 or 6, further comprising: assigning an identifier to the object of interest; and displaying the identifier in each frame of the plurality of frames that captures the object of interest.

Clause 8, the computer-implemented method of any of clauses 1-7, further comprising utilizing a neural network to analyze the data indicative of the object of interest and predict the activity associated with the object of interest.

Clause 9, the computer-implemented method of any of clauses 1-8, further comprising: determining, based on the data indicative of the object of interest, at least one of a prior state and current state of the object of interest; and predicting, based on at least one of the prior state and current state of the object of interest, a future state of the object of interest, wherein the activity associated with the object of interest is predicted based on at least one of the prior state, current state, and future state of the object of interest.

Clause 10, the computer-implemented method of any of clauses 1-9, wherein determining at least one of the prior state and current state of the object of interest comprises determining a prior movement and a current movement of the object of interest, wherein predicting the future state of the object of interest comprises predicting a future movement of the object of interest based on at least one of the prior movement and current movement of the object of interest, and wherein the activity associated with the object of interest is predicted based on at least one of the prior movement, current movement, and future movement of the object of interest.

Clause 11, the computer-implemented method of any of clauses 1-10, further comprising performing a perspective transformation of one or more of the plurality of frames containing the object of interest from a default perspective of the plurality of frames to a second perspective that is different from the default perspective.

Clause 12, the computer-implemented method of any of clauses 1-11, further comprising: predicting, based on the data indicative of the object of interest, a likelihood of the activity associated with the object of interest; and assigning a numerical value indicative of the likelihood of the activity associated with the object of interest.

Clause 13, the computer-implemented method of any of clauses 1-12, further comprising: analyzing the plurality of frames to detect a second object of interest that is present in the area of interest during the threshold period of time; tracking the second object of interest in the area of interest during the threshold period of time; extracting data indicative of the second object of interest; and predicting, based on the data indicative of the second object of interest, a second activity associated with the second object of interest.

Clause 14, the computer-implemented method of clause 13, further comprising: tracking a distance of the first object of interest to the second object of interest during the period of time, wherein the activity associated with the object of interest is an activity that interacts with the second object of interest.

Clause 15, the computer-implemented method of clause 14, wherein the first object of interest is a human and the second object of interest is a tool, wherein tracking the distance of the first object of interest to the second object of interest during the period of time comprises tracking the distance of the human to the tool during the period of time, and wherein predicting the activity associated with the object of interest comprises predicting an activity performed by the human using the tool.

Clause 16, a system to determine an activity associated with an object of interest, comprising: a storage medium;

and one or more processors configured to: receive a sequence of a plurality of frames that capture an area of interest during a threshold period of time, wherein an object of interest is present in the area of interest during the threshold period of time; analyze the plurality of frames to detect the object of interest; track the object of interest in the area of interest during the threshold period of time; extract data indicative of the object of interest; and predict, based on the data indicative of the object of interest, an activity associated with the object of interest.

Clause 17, the system of clause 16, wherein the one or more processors are further configured to: analyze the plurality of frames to detect a second object of interest that is present in the area of interest during the threshold period of time; track the second object of interest in the area of interest during the threshold period of time; extract data indicative of the second object of interest; and predict, based on the data indicative of the second object of interest, a second activity associated with the second object of interest.

Clause 18, the system of clause 17, wherein the one or more processors are further configured to: track a distance of the first object of interest to the second object of interest during the period of time, wherein the activity associated with the object of interest is an activity that interacts with the second object of interest.

Clause 19, a non-transitory machine-readable medium comprising instructions, which when executed by one or more processors, causes the one or more processors to perform operations comprising: receiving a sequence of a plurality of frames that capture an area of interest during a threshold period of time, wherein a first object of interest and a second object of interest are present in the area of interest during the threshold period of time; analyzing the plurality of frames to detect the first object of interest and the second object of interest; tracking the first object of interest and the second object of interest in the area of interest during the threshold period of time; extracting data indicative of the first object of interest and the second object of interest; predicting, based on the data indicative of the object of interest, a first activity associated with the first object of interest; and predicting, based on the data indicative of the second object of interest, a first activity associated with the second object of interest.

Clause 20, the non-transitory machine-readable medium comprising instructions, which when executed by one or more processors, causes the one or more processors to perform operations comprising: identifying a presence of the first object of interest and the second object of interest in one or more frames of the plurality of frames; tagging the first object of interest in the one or more frames to indicate the presence of the first object of interest in the one or more frames; and tagging the second object of interest in the one or more frames to indicate the presence of the second object of interest in the one or more frames.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, steps, operations, elements, and/or components, but do not preclude the presence or addition of one or more other features, steps, operations, elements, components, and/or groups thereof. In addition, the steps and components described in the above embodiments and figures are merely illustrative and do not imply that any particular step or component is a requirement of a claimed embodiment.

What is claimed is:

1. A computer-implemented method to determine an activity associated with an object of interest, the method comprising:
   receiving a sequence of a plurality of frames that capture an area of interest during a threshold period of time, wherein an object of interest is present in the area of interest during the threshold period of time;
   analyzing the plurality of frames to detect the object of interest;
   tracking the object of interest in the area of interest during the threshold period of time, wherein tracking the object of interest comprises tracking an action performed by the object of interest during the threshold period of time;
   extracting data indicative of the object of interest, wherein extracting the data comprises extracting data indicative of the action performed by the object of interest; and
   predicting, based on the data indicative of the object of interest, an activity associated with the object of interest.

2. The computer-implemented method of claim 1, wherein tracking the object of interest comprises tracking coordinates of the object of interest in the area of interest during the period of time, and wherein extracting data indicative of the object of interest comprises extracting the coordinates of the object of interest in the area of interest during the period of time.

3. The computer-implemented method of claim 1, wherein tracking the object of interest comprises tracking a movement speed and a movement direction of the object of interest in the area of interest during the period of time, and wherein extracting data indicative of the object of interest comprises extracting the movement speed and the movement direction of the object of interest in the area of interest during the period of time.

4. The computer-implemented method of claim 1, wherein analyzing the plurality of frames comprises:
   identifying a presence of the object of interest in one or more frames of the plurality of frames; and
   tagging the object of interest in the one or more frames to indicate the presence of the object of interest in the one or more frames.

5. The computer-implemented method of claim 4, further comprising analyzing previously tagged frames indicating the presence of the object of interest in the previously tagged frames, wherein the object of interest is dynamically tagged to indicate the presence of the object of interest in the one or more frames based on a comparison with the previously tagged frames.

6. The computer-implemented method of claim 4, further comprising:
   assigning an identifier to the object of interest; and
   displaying the identifier in each frame of the plurality of frames that captures the object of interest.

7. The computer-implemented method of claim 1, further comprising utilizing a neural network to analyze the data indicative of the object of interest and predict the activity associated with the object of interest.

8. The computer-implemented method of claim 1, further comprising:
   determining, based on the data indicative of the object of interest, at least one of a prior state and current state of the object of interest; and
   predicting, based on at least one of the prior state and current state of the object of interest, a future state of the object of interest, wherein the activity associated with the object of interest is predicted based on at least one of the prior state, current state, and future state of the object of interest.

9. The computer-implemented method of claim 1, wherein determining at least one of the prior state and current state of the object of interest comprises determining a prior movement and a current movement of the object of interest, wherein predicting the future state of the object of interest comprises predicting a future movement of the object of interest based on at least one of the prior movement and current movement of the object of interest, and wherein the activity associated with the object of interest is predicted based on at least one of the prior movement, current movement, and future movement of the object of interest.

10. The computer-implemented method of claim 1, further comprising performing a perspective transformation of one or more of the plurality of frames containing the object of interest from a default perspective of the plurality of frames to a second perspective that is different from the default perspective.

11. The computer-implemented method of claim 1, further comprising:
predicting, based on the data indicative of the object of interest, a likelihood of the activity associated with the object of interest; and
assigning a numerical value indicative of the likelihood of the activity associated with the object of interest.

12. The computer-implemented method of claim 1, further comprising:
analyzing the plurality of frames to detect a second object of interest that is present in the area of interest during the threshold period of time;
tracking the second object of interest in the area of interest during the threshold period of time;
extracting data indicative of the second object of interest; and
predicting, based on the data indicative of the second object of interest, a second activity associated with the second object of interest.

13. The computer-implemented method of claim 12, further comprising:
tracking a distance of the first object of interest to the second object of interest during the period of time,
wherein the activity associated with the object of interest is an activity that interacts with the second object of interest.

14. The computer-implemented method of claim 13, wherein the first object of interest is a human and the second object of interest is a tool, wherein tracking the distance of the first object of interest to the second object of interest during the period of time comprises tracking the distance of the human to the tool during the period of time, and wherein predicting the activity associated with the object of interest comprises predicting an activity performed by the human using the tool.

15. A system to determine an activity associated with an object of interest, comprising:
a storage medium; and
one or more processors configured to:
receive a sequence of a plurality of frames that capture an area of interest during a threshold period of time, wherein an object of interest is present in the area of interest during the threshold period of time;
analyze the plurality of frames to detect the object of interest;
track the object of interest in the area of interest during the threshold period of time, wherein to track the object of interest comprises to track an action performed by the object of interest during the threshold period of time;
extract data indicative of the object of interest, wherein to extract the data comprises to extract data indicative of the action performed by the object of interest; and
predict, based on the data indicative of the object of interest, an activity associated with the object of interest.

16. The system of claim 15, wherein the one or more processors are further configured to:
analyze the plurality of frames to detect a second object of interest that is present in the area of interest during the threshold period of time;
track the second object of interest in the area of interest during the threshold period of time;
extract data indicative of the second object of interest; and
predict, based on the data indicative of the second object of interest, a second activity associated with the second object of interest.

17. The system of claim 16, wherein the one or more processors are further configured to:
track a distance of the first object of interest to the second object of interest during the period of time,
wherein the activity associated with the object of interest is an activity that interacts with the second object of interest.

18. A non-transitory machine-readable medium comprising instructions, which when executed by one or more processors, causes the one or more processors to perform operations comprising:
receiving a sequence of a plurality of frames that capture an area of interest during a threshold period of time, wherein a first object of interest and a second object of interest are present in the area of interest during the threshold period of time;
analyzing the plurality of frames to detect the first object of interest and the second object of interest;
tracking the first object of interest and the second object of interest in the area of interest during the threshold period of time, wherein tracking the object of interest comprises tracking an action performed by object of interest during the threshold period of time;
extracting data indicative of the first object of interest and the second object of interest, wherein extracting the data indicative of the action performed by the object of interest;
predicting, based on the data indicative of the object of interest, a first activity associated with the first object of interest; and
predicting, based on the data indicative of the second object of interest, a first activity associated with the second object of interest.

19. The non-transitory machine-readable medium of claim 18, comprising instructions, which when executed by one or more processors, causes the one or more processors to perform operations comprising:
identifying a presence of the first object of interest and the second object of interest in one or more frames of the plurality of frames;
tagging the first object of interest in the one or more frames to indicate the presence of the first object of interest in the one or more frames; and tagging the second object of interest in the one or more frames to indicate the presence of the second object of interest in the one or more frames.

\* \* \* \* \*